Oct. 25, 1949.  S. NADELSON  2,485,837
CONTAINER FOR ELECTRICAL APPARATUS
Filed March 14, 1946  2 Sheets-Sheet 1
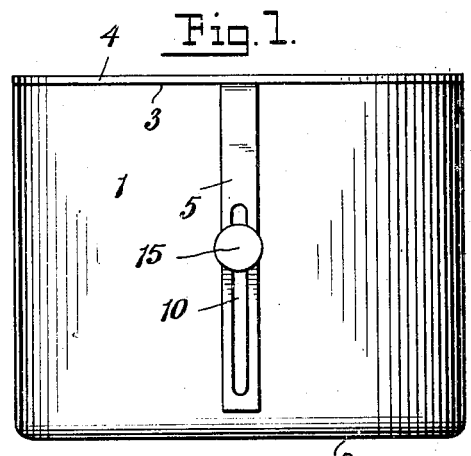
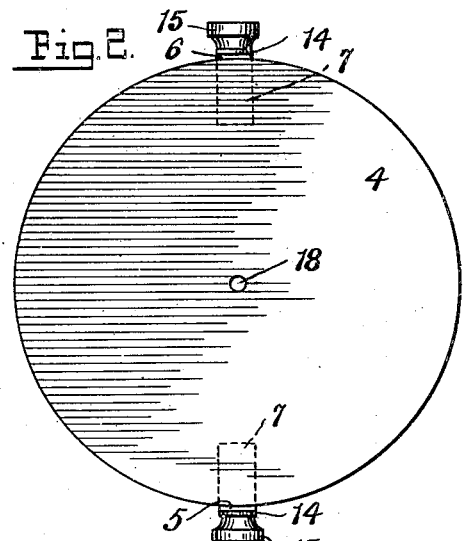
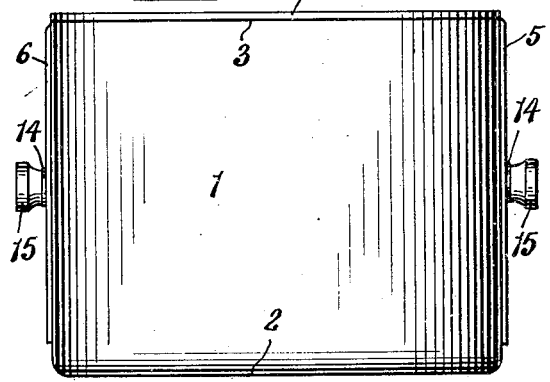
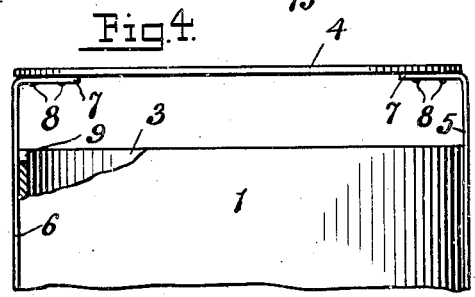
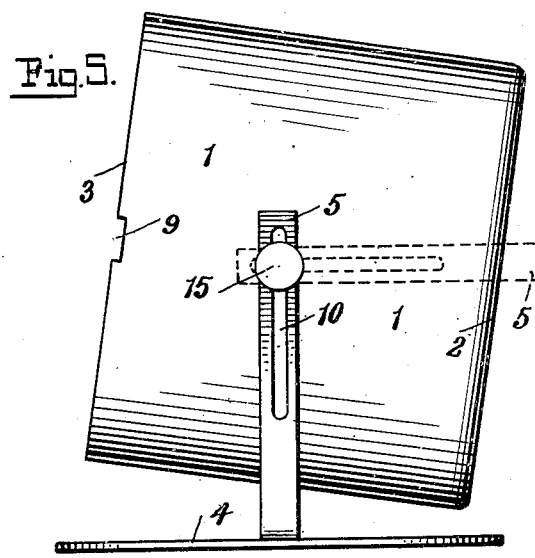
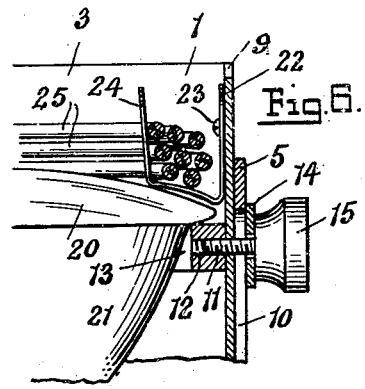
INVENTOR.
Samuel Nadelson
BY Harry Radzinsky
Attorney.

Oct. 25, 1949.  S. NADELSON  2,485,837
CONTAINER FOR ELECTRICAL APPARATUS
Filed March 14, 1946  2 Sheets-Sheet 2
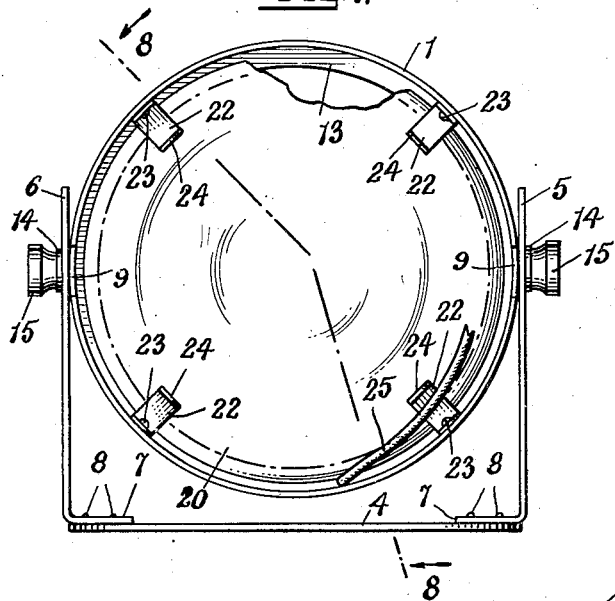
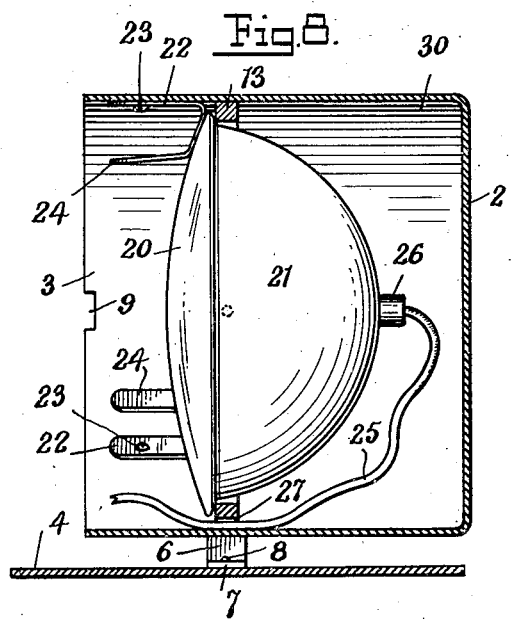
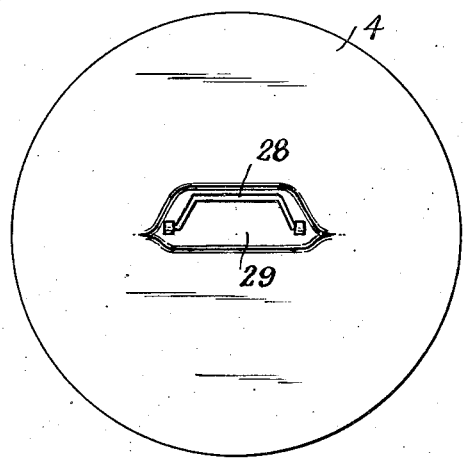
INVENTOR.
Samuel Nadelson
BY Harry Radzinsky
Attorney Patented Oct. 25, 1949

2,485,837

UNITED STATES PATENT OFFICE 2,485,837

CONTAINER FOR ELECTRICAL APPARATUS

Samuel Nadelson, New York, N. Y.

Application March 14, 1946, Serial No. 654,274

2 Claims. (Cl. 220—69)

This invention relates to improvements in electrical apparatus, and particularly to containers or housings for various kinds of electric lamps, for electric fans, heaters, and many other types of electrical apparatus, and especially those capable of being housed or contained within a compact protective container.

One of the objects of the invention is to provide a lamp or other electrical device with a casing or container which, when the lamp is stored, carried in an automobile, motorboat, or otherwise placed in a condition of non-use, will provide adequate protection for the lamp; will keep it clean, protect it from the effects of atmospheric conditions and generally maintain the lamp in good condition, thereby increasing its useful life.

Another object of the invention is to provide, in a protective casing or container, means by which a removable cover member for the casing may be utilized as a supporting base for the casing and its contents, thus enabling the casing to be easily rested upon the ground, upon a table or on any other supporting surface, or enabling the cover to be used as an attaching element by means of which the casing may be either permanently or detachably fastened to the wall, ceiling or other surface.

Still another object of the invention is to provide a lamp structure in which all parts of the lamp, including the lamp cord, may be conveniently stored within an improved casing structure, said casing structure including a watertight and if necessary, an air-tight cover so that when the cover is in place, all parts of the lamp will be fully enclosed and protected. The invention contemplates the provision of a cover member of such design and construction that said cover member can be used as a supporting means for the casing or container, enabling said cover member, when in its open position to serve as a base upon which the casing or container may be rested or by which it may be attached to a wall or other surface.

Since the present invention is applicable to various types of electrical devices, such as lamps, heating and sun-lamps, electrical heaters, fans and many other articles, the term "lamp" as herein used, is illustrative only, and is intended to comprehend such other electrical and mechanical devices as might be contained in a container construction of the kind described.

The above objects, and other objects to be hereinafter set forth are attained by the structure to be described and more particularly pointed out in the claims appended hereto.

In the accompanying drawings, wherein an illustrative embodiment of the invention is shown, Fig. 1 is a side elevation of the container in its closed position; Fig. 2 is a top plan view of the same; Fig. 3 is a side elevation of the container, the view being taken at right angles to that of Fig. 1; Fig. 4 is a side elevation of the open end of the container, showing the closure member or cover in a slightly raised position, preparatory to being swung to a position to act as a support for the container; a part of the body of the container is shown broken away and another part in section to disclose construction; Fig. 5 is a side elevation of the container, showing how the same may be supported on the cover or closure member; Fig. 6 is a sectional view through one of the pivot pins or screws and parts associated therewith; Fig. 7 is a front elevation of the container and its contents; Fig. 8 is a sectional view on the line 8—8 of Fig. 7, looking in the direction of the arrows, and Fig. 9 is a top plan view of a modified form of closure or cover member, showing the same provided with a carrying handle.

The body of the container or casing is shown at 1, and the same, in the form disclosed, is of cylindrical shape, having a closed rear end or bottom 2, and being open at the top or forward end 3. The casing or container body is provided with a cover member or closure 4 of a shape to enable it to fit over and close the open end 3 of the container and thereby co-operate with the container body to enclose the contents and protect the same. In the simple and illustrative form shown, the cover member 4 is in the shape of a disk which fits closely against the edge of the side wall of the container. If desired, the cover member 4 may be formed with a dependent skirt or flange fitting around the top or open end of the container body, or a suitable gasket or washer or other satisfactory sealing means can be interposed between the cover and the container body to assure the securement of a watertight, and if necessary an air-tight fit between the body of the container and the cover 4 to thereby protect the contents of the container to any extent required.

The cover 4 is provided with a plurality of arms, two being shown in the present embodiment, and being indicated at 5 and 6, which, when the cover is in its closed position, extend down along the outside of the container body at diametrically opposite points on the same. Each of the arms is formed with an inwardly bent end portion 7, secured to the cover member 4 by means of the rivets 8, or by other equivalent fastening means, so that each of said arms 5 and 6 constitutes a rigid extension from the cover member. In the arrangement shown, the arms are attached to the cover member in the manner described, although it is apparent that these arms might form integral extensions of the cover member 4 instead of being separate pieces secured thereto. To clear the inwardly extending portions 7 of the arms 5 and 6, the side wall of the container is provided with the two notches 9, these notches accommodating the parts 7 of the arms and enabling the cover to fit flatwisely against the edges of the body of the container and provide a secure closure for the container.

Each of the arms 5 and 6 is provided with an elongated slot 10 extending longitudinally of the arm and extending through each slot and through the side wall of the container, is a threaded set-screw 11, threadably received in an aperture 12 formed in a ring or annulus 13 located within and closely conforming to the interior shape of the container body 1. The ring or annulus 13 may be secured in position within the container, solely by means of the set-screws 11, or additional fastening means, such as rivets or screws, may be used for securing it in place.

Each of the screws 11 is provided with a head or knob permitting easy manipulation, and a washer 14 is interposed between the head 15 of the set-screw and the face of the arm through which the screw extends. This arrangement is such that by tightening the screws 11, a clamping pressure will be imposed on the arms 5 and 6 so that the same may be rigidly positioned in respect to the body of the container.

In Figs. 1 and 3, the cover member 4 is shown in closed position and is resting firmly against the edge of the wall of the container body to close the open end of the same. When the cover is in this position, the tightening of the set-screws 11 will serve to hold the cover in place and prevent it from being displaced.

In addition to serving as a cover or closure means for the container, the cover member 4 is adapted to also serve as a supporting base for the lamp. For example, in Fig. 5, the cover 4 has been swung to such a position that it acts as a base upon which the container can be rested upon a table, upon the ground or on any other available surface. Since the pins 11 act as pivotal supports for the container body 1, the container can be swung upon these pivots and brought to any desired angle or inclination while resting upon the supporting base 4.

In shifting the cover member from its closed position to that in which it acts as a rest or support for the container, the cover is first moved axially of the container and away from its open end 3, in the manner shown in Fig. 4, and to an extent necessary to enable the cover to be swung on the pivots 11 to bring it around to one side of the container so that it can act as a support for the same, as shown in Fig. 5. The slots 10 in the arms 5 and 6 permit the axial movement of the cover and its subsequent pivotal movement, as well as a raising and lowering movement until the desired position of the container is secured, whereupon the set-screws 11 are tightened to hold the container in its adjusted position.

Should it be desired to secure the lamp to a wall, ceiling or other suitable surface, the cover member 4 can act as a supporting bracket, and if desired, it can be swung around to the back of the container, as shown in dotted lines in Fig. 5, and the cover member 4 can then be attached in any suitable manner to the surface. An aperture 18 can, if desired, be provided in the cover member 4 to permit the passage of screws or other fastening means by which it may be attached.

The manner in which a lamp or other electrical device might be secured within the casing structure described, is indicated in Figs. 6 to 8 inclusive. Therein a lamp structure, consisting of a lens 20 and reflector 21 attached together as a unit in any suitable way, is shown fitted within the casing and seated against the ring 13. The lamp structure is resiliently held against the seat 13 by means of spring clips 22, secured to the side wall of the container body by screws 23. It will be noted that each of these spring clips is of substantially U-shape, being provided with an outer finger portion 24, so that these clips, in addition to resiliently holding the lamp structure in place, also serve as carriers for the lamp cord 25, which may be wound up on them and thus stored within the container body 1 when the lamp is not in use. The cord 25 extends from an outlet 26 at the rear of the lamp structure and passes through an aperture 27 in the ring 13 to the front of the lens 20 so that it may be coiled around the clips 22 and supported thereon when the lamp is not in use. The arrangement described is such that when the lamp is not in use all of the parts of the same are maintained in a compact, orderly fashion and are stored inside of the container 1. The conventional, trailing cord and plug, employed in most lamps, is thus dispensed with since the cord in this structure is enclosed in the casing, it is wound upon the clips, and the cover 4, when fitted in place over the open end 3 of the container will confine all parts of the structure, including the cord and plug, inside of the casing or container body 1. To use the lamp it is merely necessary to loosen the screws 11, move the cover 4 axially of the container body and then swing it to the desired supporting position and then tighten the screws 11. The lamp can then be placed upon a suitable support, or attached to any desired surface and placed in use. When the container is in closed condition, the contents are fully protected and the structure will withstand hard knocks and abuse without damage to the contained lamp structure.

While I have described one embodiment of the invention, it will be obvious that many changes may be made without departing from the spirit of the invention. For example, in Fig. 9, the cover member 4 is shown as being provided with a swinging handle or bail 28, the same when folded down being disposed within a depression or recess 29 in the cover so that it does not interfere with the standing of the cover upon a flat surface. If the lamp employed is battery-powered, the space 30 within the container body to the rear of the lamp structure can be employed to hold the batteries. To simplify the mounting of the lamp within the container, the spring clips 22 might be secured to the ring or annulus 13 instead of to the wall of the container, thereby enabling the lamp structure, the ring 13 and the spring clips to be assembled outside of the container and then placed in the container and held therein by the set-screws 11 and/or other securing means. The arms 5 and 6 of the cover may be formed as an integral part of the cover, and additional securing means for the cover might be employed. Various other changes will be apparent, such changes being contemplated as within the scope of the claims appended hereto.

What I claim is:

1. A device of the character described comprising, a casing for a lamp or other electrical device, said casing being open at the front end and closed at its rear end, a combined cover and supporting base for the casing consisting of a cover element shaped to fit over and close the forward open end of the casing, said cover having a flat outer face permitting it to be rested against a flat surface, the cover member having slotted arms extending substantially normal to said face and rigidly secured to said cover and embracing the sides of the casing and being slidably and adjustably secured to the casing at diametric points along an axis passing through the casing substantially at the intersection of medial longitudinal and transverse planes whereby the cover member may be either seated over the open front end of the casing or it may be swung to a position at either the side of the casing or behind the closed end of the casing to enable it to act as a supporting base for the casing while in either of the two latter positions, and said slots being of a length whereby the cover when positioned below the casing as a base support, the side arms will support the casing in an elevated position, and means for locking the arms in any position of the cover member relatively to the casing.

2. A device of the character described comprising, a casing for a lamp or other electrical device, said casing being open at the front end and closed at its rear end, a combined cover and supporting base for the casing consisting of a cover element shaped to fit over and close the forward open end of the casing, said cover having a flat outer face permitting it to be rested against a flat surface, the cover member having a pair of slotted arms rigidly secured thereto and projecting therefrom a distance greater than one-half the height or breadth of the casing and in a plane normal to said face and extending along opposite sides of the casing and being slidably and adjustably secured to the casing at diametric points along a line intersecting the casing substantially at the mid-point thereof whereby the cover may be either seated over the open front end of the casing or it may be swung to a position at either the side of the casing or behind the closed end of the casing to enable it to act as a supporting base for the casing while in either of the two latter positions, adjustable elements entering the slots in the arms, the slots being at the free ends of said arms and of sufficient length to enable the cover member to be moved to any of the aforesaid positions to serve as either a closure or supporting base, the adjustable elements including means for locking the arms in any position of the cover member relatively to the casing.

SAMUEL NADELSON.

REFERENCES CITED

The following references are of record in the file of this patent:

UNITED STATES PATENTS

| Number | Name | Date |
| --- | --- | --- |
| 442,434 | Harmer | Dec. 9, 1890 |
| 1,199,596 | Noll | Sept. 26, 1916 |
| 1,431,822 | Lamb | Oct. 10, 1922 |
| 1,432,429 | Thorpe | Oct. 17, 1922 |
| 1,440,694 | Potstada | Jan. 2, 1923 |
| 1,798,079 | Gilbert | Mar. 24, 1931 |
| 2,267,707 | Bosten | Dec. 30, 1941 |

FOREIGN PATENTS

| Number | Country | Date |
| --- | --- | --- |
| 10,609 | Great Britain | 1908 |
| 34,397 | France | Jan. 2, 1929 |
| 406,847 | France | Dec. 17, 1909 |